United States Patent [19]

Okamura et al.

[11] Patent Number: 5,283,044
[45] Date of Patent: Feb. 1, 1994

[54] SUPER HEAT-RESISTANT SILICON CARBIDE FIBERS FROM POLY-CARBOSILANE

[75] Inventors: Kiyohito Okamura, Sakai; Hiroshi Ichikawa, Yokohama; Michio Takeda, Yamato; Tadao Seguchi, Takasaki; Noboru Kasai, Takasaki; Masanobu Nishii, Takasaki, all of Japan

[73] Assignees: Japan Atomic Energy Research Institute; Nippon Carbon Co., Ltd., both of Tokyo, Japan

[21] Appl. No.: 797,549

[22] Filed: Nov. 25, 1991

[51] Int. Cl.⁵ ............................................. C04B 35/56
[52] U.S. Cl. .................................... 423/345; 501/88; 501/95; 264/22; 264/66
[58] Field of Search .................. 423/345; 501/88, 95; 156/DIG. 112; 264/22, 66, 211.15, 211.17

[56] References Cited

U.S. PATENT DOCUMENTS

| | | | |
|---|---|---|---|
| 4,097,294 | 6/1978 | Rice et al. | 106/43 |
| 4,110,386 | 8/1978 | Yajima et al. | 264/29.5 |
| 4,117,057 | 9/1978 | Yajima et al. | 264/63 |
| 4,122,139 | 10/1978 | Yajima et al. | 264/44 |
| 4,283,376 | 8/1981 | Yajima et al. | 423/345 |
| 4,631,179 | 12/1986 | Smith, Jr. | 423/345 |
| 4,800,221 | 1/1989 | Marko | 528/10 |
| 5,071,600 | 12/1991 | Deleeuw et al. | 264/22 |
| 5,162,269 | 11/1992 | Deleeuw et al. | 501/88 |
| 5,171,722 | 12/1992 | Toreki et al. | 501/88 |

FOREIGN PATENT DOCUMENTS 3-119113  5/1991  Japan .
3-220318  9/1991  Japan .

OTHER PUBLICATIONS

Okamura et al., Journal of Materials Science Letters 4 (1985) pp. 55–57.

*Primary Examiner*—Olik Chaudhuri
*Assistant Examiner*—Ken Horton
*Attorney, Agent, or Firm*—Bucknam and Archer

[57] ABSTRACT

A super heat-resistant silicon carbide fiber has an oxygen content of less than 0.1% by weight. In a process for producing the super heat-resistant silicon carbide fiber, a precursor fiber prepared by spinning a polycarbosilane having an oxygen content of less than 0.8% by weight is irradiated with a radiation in an oxygen-free atmosphere or in vacuo to make the precursor fiber infusible. The infusibilized fiber is fired in an oxygen-free atmosphere or in vacuo at a temperature of from 1000° to 2200° C. without exposure to an oxidizing atmosphere; or stabilized in the same atmosphere at a temperature of from 300° to 600° C. without exposure to an oxidizing atmosphere and fired in an oxygen-free atmosphere or in vacuo at a temperature of from 1000° to 2200° C.

2 Claims, No Drawings

SUPER HEAT-RESISTANT SILICON CARBIDE FIBERS FROM POLY-CARBOSILANE

BACKGROUND OF THE INVENTION

1. Field of the Invention

The present invention relates to a super heat-resistant silicon carbide fiber having a high heat resistance particularly in an oxygen-free atmosphere, and a process for producing the same. More particularly, the present invention is concerned with a silicon carbide fiber which is produced from an organosilicon polymer compound such as polycarbosilane and has a high strength, a high modulus of elasticity and a very high heat resistance particularly in an oxygen-free atmosphere, and a process for producing the same.

2. Prior Art

The process for producing a silicon carbide fiber through the use of an organosilicon polymer compound as a precursor generally comprises three steps of spinning, infusibilization and firing.

Among these steps, the spinning step is one for preparing a precursor fiber having a small diameter through the melt spinning of an organosilicon polymer compound such as polycarbosilane.

In the infusibilization step, the precursor fiber undergoes a crosslinking reaction so that the fiber is made insoluble and infusible in the subsequent step of firing. In the prior art, the precursor fiber has been generally heat-treated in an oxidizing atmosphere such as air to bring about the crosslinking reaction (hereinafter referred to as "thermal oxidation process").

In the firing step, the infusibilized fiber is converted into an inorganic compound to give a silicon carbide fiber. In the prior art, the infusibilized fiber has been generally treated at a high temperature of about 1200° C. in an oxygen-free atmosphere or in vacuo.

The silicon carbide fiber will find applications mainly as a composite material (FRM) comprising the silicon carbide fiber and a metal, and a composite material (FRC) comprising the silicon carbide fiber and a ceramic in the future. In order to use the silicon carbide fiber for such applications, the silicon carbide fiber should have a high heat resistance at least in an oxygen-free atmosphere.

As described above, in the prior art, however, since the precursor fiber is made infusible through the crosslinking reaction of an organosilicon polymer compound by means of oxygen, the resultant silicon carbide fiber is a ternary composition comprising silicon, carbon and oxygen and containing 8 to 20% by weight of oxygen. In such a silicon carbide fiber, a defect occurs in the fiber in an oxygen-free atmosphere at a high temperature of 1300° C. or above through the elimination of CO and SiO gases according to the following formulae (1) and (2):

$$SiO_2 + 3C \rightarrow SiC + 2CO \uparrow \quad (1)$$

$$Si + C + O \rightarrow \tfrac{1}{2}CO \uparrow + \tfrac{1}{2}SiO \uparrow + \tfrac{1}{2}SiC \quad (2)$$

Further, the formation of SiC causes silicon carbide crystal grains to be coarsened. For this reason, the silicon carbide fiber prepared by the above-described conventional process exhibits a poor heat resistance due to a remarkable deterioration of the fiber strength particularly at 1500° C. or above.

Other known methods of making the precursor fiber infusible include one wherein the precursor fiber is irradiated with a radiation in an atmosphere containing oxygen, such as air (see J. P. Appln. Laid-Open Gazette No. (Sho.) 53-103025). Even when this method is employed, the resultant silicon carbide fiber contains 7 to 30% by weight of oxygen as in the above-described thermal oxidation process and therefore is poor in heat resistance.

Further, some of the present inventors have disclosed a method wherein the precursor fiber is irradiated with a radiation in an oxygen-free atmosphere or in vacuo (see Proc. 1st Japan Int. SAMPE Symp., pp. 929-934, Nov. 28-Dec. 1, 1989). In the prior art, however, the fiber irradiated with a radiation for making the fiber infusible is placed as such in the air, afterwhich the infusibilized fiber is fired. Therefore, there is a limitation on the reduction of the oxygen content of the resultant silicon carbide fiber, and the silicon carbide fiber is unsatisfactory in heat resistance. Further, the above-described literature discloses that the oxygen content in the silicon carbide fiber is reduced when the infusibilized fiber is annealed by heating at about 250° C. before being fired. In this method, however, the oxygen content in the silicon carbide fiber can be reduced to only 1 to 2% by weight.

SUMMARY OF THE INVENTION

An object of the present invention is to solve the above-described problems and to provide a high-strength silicon carbide fiber having a very high heat resistance and a simple process for producing said fiber.

The present inventors have made intensive studies with a view to attaining this object and, as a result, have found that a silicon carbide fiber having an oxygen content of less than 1.0% by weight and capable of withstanding a high temperature of 1800° C. or above unattainable by the prior art can be produced by irradiating a precursor fiber formed through the use of a particular polycarbosilane with a radiation in an oxygen-free atmosphere or in vacuo to make the precursor fiber infusible and firing the infusibilized fiber in an oxygen-free atmosphere or in vacuo without exposure to an oxidizing atmosphere, such as air, or firing the infusibilized fiber in an oxygen-free atmosphere or in vacuo after a particular stabilizing treatment and optionally after taking the stabilized fiber out in air to make contact with oxygen. The present invention has been made based on this finding.

The present invention relates to a super heat-resistant silicon carbide fiber characterized by having an oxygen content of less than 1.0% by weight and a process for producing said super heat-resistant silicon carbide fiber.

At the outset, the super heat-resistant silicon carbide fiber of the present invention will be described.

The oxygen content in the silicon carbide fiber of the present invention should be less than 1.0% by weight. This is because when the oxygen content is 1.0% by weight or more, a heat resistance of 1800° C. or above cannot be attained.

In the silicon carbide fiber of the present invention, although there is no particular limitation except for the above-described oxygen content, the molar ratio of carbon to silicon (C/Si) is generally preferably 1.01 to 1.60. When the C/Si value is outside this range, that is, less than 1.01, there is a tendency that the growth of silicon carbide crystal becomes so significant particularly at 1800° C. or above that the fibrous form cannot be maintained. On the other hand, when the C/Si value exceeds 1.60, the fiber is liable to be oxidized at a high temperature. It is still preferred that the silicon carbide fiber have such a composition that the silicon content and the carbon content are 59 to 69% by weight and 31 to 41% by weight, respectively.

The process according to the present invention by which a super heat-resistant silicon carbide fiber can be produced will now be described.

In the process according to the present invention, a precursor fiber prepared by spinning a polycarbosilane having an oxygen content of less than 0.8% by weight is first made infusible through irradiation with a radiation in an oxygen-free atmosphere or in vacuo.

No importance has hitherto been given to the oxygen content in the polycarbosilane as the starting material. By contrast, in the present invention, the polycarbosilane should have an oxygen content of less than 0.8% by weight, preferably 0.5% by weight. This is because when the oxygen content in the polycarbosilane is not less than 0.8% by weight, preferably 0.5% by weight. This is because when the oxygen content in the polycarbosilane is not less than 0.8% by weight, it is impossible to produce a silicon carbide fiber having an oxygen content of less than 1.0% by weight.

Representative examples of the process for producing the polycarbosilane include:

(i) a process disclosed in Japanese Patent Appln. Publication Gazette No. (Sho.) 57-26527 (J. P. Application No. (Sho.) 50-50223) wherein the polycarbosilane is synthesized from dodecamethylcyclohexasilane;

(ii) a process disclosed in Japanese Patent Appln. Publication Gazette No. (Sho.) 58-38535 (J. P. Application No. (Sho.) 50-79972) and Japanese Patent Appln. Publication Gazette No. (Sho.) 57-53894 (J. P. Application No. (Sho.) 50-107371) wherein the polycarbosilane is synthesized from polydimethylsilane; and (iii) a process disclosed in Japanese Patent Appln. Publication Gazette No. (Sho.) 57-56567 (J. P. Application No. (Sho.) 51-124653) and J. P. Appln. Laid-Open Gazette No. (Sho.) 54-61299 (J. P. Application No. (Sho.) 52-127630) wherein the polycarbosilane is synthesized by adding polyborodiphenylsiloxane to polydimethylsilane.

In the process (i) among the above-described processes, since the dodecamethylcyclohexasilane is cyclic and contains no oxygen, the resultant polycarbosilane has an oxygen content of about 0.1% by weight. In the process (ii), since a hydroxyl group is attached to the end of the polydimethylsilane, the resultant polycarbosilane has an oxygen content of 0.3 to 1.1% by weight. In this process(ii), when a polydimethylsilane having a lower degree of polymerization is used, a polycarbosilane having a higher oxygen content is obtained. In the process (iii), since use is made of a polyborodiphenylsiloxane having a high oxygen content, the oxygen content of the resultant polycarbosilane is 0.8 to 3.0% by weight.

Therefore, in the present invention, it is preferred to use a polycarbosilane prepared in the process (i), or a polycarbosilane prepared in the process (ii) through the use of a polydimethylsilane having an average degree of polymerization of 60 or more.

In the process according to the present invention, the precursor fiber is made infusible in an oxygen-free atmosphere or in vacuo, and an inert gas atmosphere such as helium is preferred as the oxygen-free atmosphere.

Further, in the present invention, the precursor fiber is irradiated with a radiation in the above-described atmosphere to make the precursor fiber infusible through a crosslinking reaction in which oxygen does not participate in. In this case, no external heating is necessary.

Preferred examples of the radiation include ionizing radiations, such as an electron beam and a gamma ray.

When use is made of an electron beam, the electron beam accelerating voltage is preferably in the range of from 20 kV to 10 MV. Further, in the irradiation, the dose rate and the dose are preferably 1 to $10^5$ Gy/sec and 0.1 to 100 MGy, respectively. When the accelerating voltage is less than 20 kV, the transmittance of the electron beam is so small that there is a fear of the infusibilizing treatment of the fiber becoming insufficient. On the other hand, when the accelerating voltage exceeds 10 MV, the activation is liable to occur and the apparatus is expensive, which is unsuitable for practical use. When the dose rate is less than 1 Gy/sec, the infusibilizing treatment takes much time, so that the profitability is lower. On the other hand, when the dose rate exceeds $10^5$ Gy/sec, the precursor fiber generates heat the fusion is not satisfactory so that there is the possibility that the fibrous form cannot be maintained. When the dose is less than 0.1 MGy, the infusibilization is so insufficient that the fibrous form cannot be maintained during firing. On the other hand, when the dose exceeds 100 MGy, the necessary irradiation time becomes so long that the profitability is lower. In this case, the container for holding the fiber is preferably one provided with a metal foil on the irradiation surface wherein evacuation is possible.

On the other hand, when use is made of a gamma ray, it is preferred to use $^{60}$Co or the like as a radiation source at a dose rate of 0.1 to $10^2$ Gy/sec in a dose of 0.1 to 100 MGy. When the dose rate is less than 0.1 Gy/sec, the infusibilizing treatment takes much time, so that the profitability is lower, while a radiation source wherein the dose rate exceeds $10^2$ Gy/sec is unsuitable for practical use. When the dose is less than 0.1 MGy, the infusibilization is so insufficient that the fiber melts during firing, which makes it impossible to maintain the fibrous form. On the other hand, when the dose exceeds 100 MGy, the necessary irradiation time becomes so long that the profitability lowers. In this case, the container for holding the fiber is preferably one having such a structure that evacuation is possible.

In the first process according to the present invention, the infusibilized fiber should be fed to the following step of firing without exposure to an oxidizing atmosphere such as air. This is because the contact of the fiber with oxygen in the course of a series of steps from the infusibilization step to the firing step makes it impossible to produce a silicon carbide fiber having an oxygen content of less than 1.0% by weight. Specific examples of the method of avoiding the exposure of the infusibilized fiber to an oxidizing atmosphere which can be generally used in the present invention include a method wherein firing is conducted immediately after the infusibilization in an oxygen-free atmosphere or in vacuo preferably in the same container, and a method wherein the fiber after the infusibilization is temporarily sealed hermetically and held in an oxygen-free atmosphere or in vacuo and before being fired.

In the second process according to the present invention, the infusibilized fiber should be heat-treated in a similar atmosphere at a temperature in the range of from 300° to 600° C. without exposure to an oxidizing atmosphere such as air to stabilize the infusibilized fiber, and the infusibilized fiber thus stabilized is fed to the firing step which will be described later. The stabilization of the infusibilized fiber in the above-described temperature range enables the oxygen content in the stabilized infusibilized fiber to be maintained below 0.8% or less even when the stabilized fiber is taken out in an oxidizing atmosphere such as air for unwinding or other purpose. Therefore, even when the stabilized infusibilized fiber is taken out in an oxidizing atmosphere such as air and then subjected to firing which will be described later, it is possible to produce a silicon carbide fiber having an oxygen content of less than 1.0% by weight. The second process according to the present invention is preferred as an industrial process. As described above, the heat treatment is generally conducted in the same container after the infusibilization, or conducted after the infusibilized fiber is temporarily sealed hermetically and held in an oxygen-free atmosphere or in vacuo.

In the present invention, the firing should be conducted in an oxygen-free atmosphere or in vacuo. The oxygen-free atmosphere is preferably an inert gas, such as argon, or a nitrogen atmosphere. This is because when the infusibilized fiber or the stabilized infusibilized fiber (in this case, the infusibilized fiber may be exposed to an oxidizing atmosphere before being fired) is fired in an atmosphere containing oxygen, no silicon carbide fiber having an oxygen content of less than 1.0% by weight can be obtained.

The firing temperature is preferably 1000° to 2200° C., more preferably 1500° to 2000° C. When the firing temperature is lower than 1000° C., the conversion of the infusibilized fiber into an inorganic compound is so insufficient that the heat resistance inherent in the silicon carbide fiber cannot be developed. On the other hand, when the firing temperature exceeds 2200° C., the silicon carbide begins to sublime so that the fiber is liable to decompose.

In the firing step, the temperature-raising rate is preferably 100° C./hr or less at least when the firing temperature is in the range of from 1000° to 1100° C. This is because when the firing is conducted in this temperature range at a temperature-raising rate exceeding 100° C./hr, small cracks appear on part of the surface of the fiber, so that the mechanical strength and modulus of elasticity of the resultant fiber are liable to lower. When the firing temperature is outside the above-described range, the temperature-raising rate may be increased to shorten the firing time and may be, for example, about 600° to 1200° C./hr.

In the above-described process according to the present invention, the silicon carbide fiber of the present invention having a remarkably lowered oxygen content of less than 1.0% by weight can be produced with a high efficiency. In the above-described silicon carbide fiber, even at a high temperature of 1800° to 2000° C. in an oxygen-free atmosphere, the decarbonylation reaction and the coarsening of crystal grains hardly occur, and even in the case of heating at 1800° C., the fiber strength can be maintained on a high level, that is, the tensile strength and the tensile modulus of elasticity are 2.40 to 1.50 GPa and 290 to 220 GPa, respectively. Therefore, the silicon carbide fiber is a high-strength silicon carbide fiber having a very excellent heat resistance.

Action

The irradiation of a precursor fiber prepared through the spinning of a polycarbosilane with a radiation in an oxygen-free atmosphere or in vacuo causes a crosslinking reaction in which oxygen does not participate to occur, so that the precursor fiber becomes infusible. In this case, since the irradiation is conducted in an oxygen-free atmosphere or in vacuo, no reaction of the elements in the fiber with oxygen occurs.

Since, however, a large amount of a radical remains in the precursor fiber even after the irradiation, the active radical in the fiber rapidly reacts with oxygen when the infusibilized fiber is taken out in the air, so that the silicon carbide fiber produced by the firing contains 2 to 12% by weight of oxygen.

In the present invention, since the firing is conducted without contact of the infusibilized fiber with oxygen, or the infusibilized fiber is stabilized under a particular condition without contact of the infusibilized fiber with oxygen, no reaction of the radical with oxygen occurs, so that the oxygen content in the resultant silicon carbide fiber is held on a very low level, that is, to less than 1.0% by weight.

The deterioration of a silicon carbide fiber in an oxygen-free atmosphere at a high temperature occurs according to the above-described reactions (1) and (2) and is attributable mainly to the oxygen present in the fiber. That is, there is a tendency that the lower the oxygen content in the fiber, the better the heat resistance.

As described above, since the oxygen content in the silicon carbide fiber of the present invention is very low, that is, less than 1.0% by weight, even at a high temperature of 1800° to 2000° C., the dicarbonylation and coarsening of the silicon carbide crystal grains hardly occur. For the reason, the silicon carbide fiber of the present invention has a high strength kept even at the above-described high temperature.

Effect of the Invention

As described above, the silicon carbide fiber of the present invention having an oxygen content of less than 1.0% by weight has a very high heat resistance and can withstand a high temperature of 1800° to 2000° C. in an oxygen-free atmosphere. That is, the high strength and flexibility inherent in the silicon carbide fiber of the present invention are kept even at the above-described high temperature. Therefore, the silicon carbide fiber of the present invention can be used, for example, also in the field of general industries, such as the space and aeronautical industry, ceramics industry, and iron and steel industry, or domestic fields, where the application of the silicon carbide fiber has hitherto been impossible due to the need of super heat resistance.

The silicon carbide fiber of the present invention can be used in the form of single fiber, yarn, robing cable, strand, filament or chopped filament. Further, the fiber of this invention can also be fabricated into woven cloth, sleeve or rope owing to its small fiber diameter and flexibility. Furthermore, the fiber of this invention can most preferably be used in the form of a composite material comprising the silicon carbide fiber and metal, ceramic or the like. The silicon carbide fiber of the present invention is very useful, for example, for fibrous heating elements, fireproof woven cloths, materials for a nuclear reactor, materials for a nuclear fusion reactor, materials for a rocket and various fireproofing materials by virtue of its features, such as heat resistance, high strength, high elasticity, light weight and abrasion resistance.

Further, the process of the present invention enables the above-described super heat-resistant silicon carbide fiber of the present invention to be produced conveniently with a high efficiency. Therefore, the process according to the present invention is suitable for the production of the super heat-resistant silicon carbide fiber of the present invention.

DESCRIPTION OF THE PREFERRED EMBODIMENTS

The present invention will be described in more detail with reference to the following Examples and Comparative Examples.

EXAMPLE 1

A polydimethylsilane having an average degree (n) of polymerization of 200 represented by the formula

$$HO\text{-}[Si(CH_3)_2]_n\text{-}OH$$

was heated at 470° C. for 10 hr in an autoclave in a nitrogen gas atmosphere to conduct a pyrolytic rearrangement reaction, and the product was taken out in the form of a solution thereof in xylene. Subsequently, the xylene containing the product dissolved therein was distilled in a nitrogen gas atmosphere at 150° C. and 1 atm to remove xylene and then subjected to distillation under reduced pressure at 300° C. and 1 mmHg to remove low molecular weight components, thereby giving a polycarbosilane having a number-average molecular weight of 2000 and an oxygen content of 0.3% by weight.

The polycarbosilane was first melt-spun in a nitrogen atmosphere into a precursor fiber having an average diameter of 20 μm.

The precursor fiber was then irradiated in a helium gas stream with electron beams with a dose rate of $10 \times 10^3$ Gy/sec to a dose of 15 MGy to make the precursor fiber infusible.

Subsequently, the infusibilized fiber was fired without being taken out in the air by heating in an argon gas stream to 1000° C. at a temperature-raising rate of 100° C./hr to give a silicon carbide fiber having an average diameter of 14 μm.

The resultant silicon carbide fiber was subjected to the measurement of the tensile strength, tensile modulus of elasticity, oxygen content and molar ratio of carbon to silicon, and the results are given in Table 1.

Subsequently, the silicon carbide fiber was divided into three samples, which were then heated respectively in an argon gas atmosphere at 1600° C., 1800° C. and 2000° C. for 1 hr. As a result, all the fibers were flexible and retained the fibrous form. Further, the individual silicon carbide fibers were subjected to the measurement of the tensile strength and tensile modulus of elasticity. The results are given in Table 1.

Further the surface of the each silicon carbide fiber was observed under a scanning electron microscope. As a result, each of them had a smooth surface and neither deposit nor defect was observed on the surface.

TABLE 1

|  | Firing (heating) temp. (°C.) | | | |
| --- | --- | --- | --- | --- |
|  | 1000 | 1600 | 1800 | 2000 |
| tensile strength [GPa] | 2.50 | 2.80 | 2.00 | 1.80 |
| tensile modulus of elasticity [GPa] | 170 | 260 | 270 | 270 |
| oxygen content [wt. %] | 0.35 | — | — | — |

TABLE 1-continued

|  | Firing (heating) temp. (°C.) | | | |
| --- | --- | --- | --- | --- |
|  | 1000 | 1600 | 1800 | 2000 |
| molar ratio of carbon to silicon (C/Si) | 1.35 | — | — | — |

As is apparent from the Table 1, the silicon carbide fiber of the present Example is one less susceptible to a lowering in the fiber strength even when heated at 2000° C., that is, having a high strength and a high modulus of elasticity which can satisfactorily withstand the use even at 2000° C.

EXAMPLE 2

Dodecamethylcyclohexasilane represented by the formula $Si_6(CH_3)_{12}$ was heated at 480° C. for 10 hr in an autoclave in a nitrogen gas atmosphere to conduct a pyrolytic rearrangement reaction, and the procedure of the Example 1 was repeated to give a polycarbosilane having a number-average molecular weight of 1800 and an oxygen content of 0.1% by weight, from which a precursor fiber was prepared.

The precursor fiber was vacuum-sealed in a quartz glass tube and irradiated with a gamma ray to make the precursor fiber infusible. The radiation source was $^{60}Co$, and the irradiation was conducted with a dose rate of 10 Gy/sec to a dose of 12 MGy.

Then the infusibilized fiber was placed in an electric oven in an argon gas stream without being taken out in air and heated to predetermined temperatures at a temperature-raising rate of 100° C./hr to conduct firing to produce silicon carbide fibers having an average diameter of 14 μm. The firing temperatures were respectively at 1000° C., 1600° C., 1800° C. and 2000° C.

Various properties of the resultant silicon carbide fibers were measured and the results are given in Table 2.

TABLE 2

|  | Firing temp. (°C.) | | | |
| --- | --- | --- | --- | --- |
|  | 1000 | 1600 | 1800 | 2000 |
| tensile strength [GPa] | 2.80 | 2.60 | 2.20 | 2.00 |
| tensile modulus of elasticity [GPa] | 180 | 230 | 250 | 270 |
| oxygen content [wt. %] | 0.2 | 0.2 | 0.2 | 0.2 |
| molar ratio of carbon to silicon (C/Si) | 1.41 | 1.36 | 1.40 | 1.35 |

As is apparent from the Table 2, as with the silicon carbide fiber of the Example 1, the silicon carbide fiber of the present Example can satisfactorily withstand the use even at 2000° C.

EXAMPLE 3

A polycarbosilane having a number-average molecular weight of 2000 and an oxygen content of 0.5% by weight was prepared in the same manner as that of the Example 1, except that use was made of a polydimethylsilane having an average degree (n) of polymerization of 120, and a precursor fiber was prepared from the polycarbosilane.

Subsequently, the precursor fiber was made infusible and then heated to 1200° C. at a temperature-raising rate of 100° C./hr to conduct firing in the same manner as that of the Example 1, thereby producing a silicon carbide fiber having an average diameter of 14 μm.

The resultant silicon carbide fiber was subjected to the measurement of various properties and the results are given in Table 3.

Subsequently, the silicon carbide fiber was divided into three samples, which were then heated in an argon gas atmosphere at 1600° C. and 1800° C. for 2 hr. As a result, all the fibers were flexible and retained the fibrous form. Further, each of the fibers had a smooth surface and no defect was observed on the surface. Each of these fibers was subjected to the measurement of the tensile strength and tensile modulus of elasticity. The results are given in the Table 3.

TABLE 3

|  | Firing (heating) temp. (°C.) | | |
| --- | --- | --- | --- |
|  | 1200 | 1600 | 1800 |
| tensile strength [GPa] | 2.70 | 2.50 | 1.60 |
| tensile modulus of elasticity [GPa] | 200 | 230 | 240 |
| oxygen content [wt. %] | 0.7 | — | — |
| molar ratio of carbon to silicon (C/Si) | 1.39 | — | — |

As is apparent from the Table 3, the silicon carbide fibers of the present invention maintained their excellent mechanical properties even when heated at 1800° C.

EXAMPLE 4

A polycarbosilane having a number-average molecular weight of 2000 and an oxygen content of 0.7% by weight was prepared in the same manner as that of the Example 1, except that use was made of a polydimethylsilane having an average degree (n) of polymerization of 60, and a precursor fiber was prepared from the polycarbosilane.

Subsequently, the precursor fiber was made infusible and then heated to predetermined temperatures at a temperature-raising rate of 100° C./hr to conduct firing in the same manner as that of the Example 1, thereby producing silicon carbide fibers having an average diameter of 14 μm. The firing was conducted at each of 1000° C., 1600° C. and 1800° C.

Various properties of the resultant silicon carbide fibers were measured and the results are given in Table 4.

TABLE 4

|  | Firing temp. (°C.) | | |
| --- | --- | --- | --- |
|  | 1000 | 1600 | 1800 |
| tensile strength [GPa] | 2.80 | 2.20 | 1.50 |
| tensile modulus of elasticity [GPa] | 170 | 210 | 220 |
| oxygen content [wt. %] | 0.9 | 0.7 | 0.4 |
| molar ratio of carbon to silicon (C/Si) | 1.30 | 1.30 | 1.25 |

As is apparent from the Table 4, the silicon carbide fibers of the present invention maintained their excellent mechanical properties even when heated at 1800° C.

EXAMPLE 5

A precursor fiber prepared in the same manner as that of the Example 1 was made infusible under the same condition as that of the Example 1 and continuously heated in an argon gas stream to 600° C. at a temperature-raising rate of 25° C./hr without being taken out in air, thereby stabilizing the infusibilized fiber.

Then the stabilized fiber was temporarily taken out in air and heated in a nitrogen gas atmosphere to 1000° C. at a temperature-raising rate of 25° C./hr to fire the fiber, thereby producing a silicon carbide fiber having an average diameter of 14 μm.

Various properties of the resultant silicon carbide fiber were measured and the results are given in Table 5.

EXAMPLE 6

A precursor fiber prepared in the same manner as that of the Example 1 was made infusible under the same condition as that of the Example 1 and continuously heated in an argon gas stream to 550° C. at a temperature-raising rate of 20° C./hr without being taken out in air, thereby stabilizing the infusibilized fiber.

Then the stabilized fiber was temporarily taken out in air and heated in a nitrogen gas atmosphere to predetermined temperatures to fire the fiber, thereby producing silicon carbide fibers having an average diameter of 14 μm. The firing temperatures were 1200° C., 1800° C. and 2000° C. The heating was conducted at a temperature-raising rate of 25° C./hr until the temperature reached 1200° C., and at a temperature-raising rate of 1000° C./hr after the temperature exceeded 1200° C.

Various properties of the resultant silicon carbide fibers were measured and the results are given in Table 5.

EXAMPLE 7

A silicon carbide fiber having an average diameter of 14 μm was prepared in the same manner as that of the Example 5, except that the maximum temperature in the stabilizing treatment was 300° C. Various properties of the resultant silicon carbide fiber were measured and the results are given in Table 5.

TABLE 5

|  | Ex. 5 firing temp. [°C.] | Ex. 6 firing temp. [°C.] | | | Ex. 7 firing temp. [°C.] |
| --- | --- | --- | --- | --- | --- |
|  | 1000 | 1200 | 1800 | 2000 | 1000 |
| tensile strength [GPa] | 2.80 | 3.30 | 2.40 | 2.10 | 2.60 |
| tensile modulus of elasticity [GPa] | 190 | 220 | 290 | 260 | 170 |
| oxygen content [wt. %] | 0.7 | 0.3 | 0.4 | 0.3 | 0.8 |
| molar ratio of carbon to silicon (C/Si) | 1.34 | 1.36 | 1.36 | 1.40 | 1.35 |

As is apparent from the Table 5, each the silicon carbide fibers of the Examples 5 to 7 produced by conducting firing after stabilization under particular conditions had an oxygen content of 1.0% by weight or less despite of being in contact with air before firing, and had a high strength and a high modulus of elasticity which can sufficiently withstand the use at 2000° C.

COMPARATIVE EXAMPLE 1

To a polydimethylsilane having an average degree (n) of polymerization of 200 was added 1% by weight of a polydiphenylborosiloxane represented by the formula

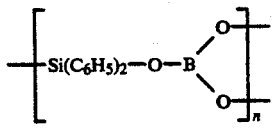

and the mixture was heated in a nitrogen gas atmosphere under a pressure of 1 atm at 420° C. for 10 hr to conduct a pyrolytic rearrangement reaction. The reaction mixture was subjected to vacuum distillation at 300° C. under a pressure of 1 mmHg to remove low molecular weight components, thereby preparing a polycarbosilane having a number-average molecular weight of 2500 and an oxygen content of 1.0% by weight, and a precursor fiber was prepared from the polycarbosilane in the same manner as that of the Example 1.

Subsequently the precursor fiber was made infusible and then heated to 1000° C. to fire the fiber in the same manner as that of the Example 1, thereby producing a silicon carbide fiber having an average diameter of 14 μm.

Various properties of the resultant silicon carbide fiber were measured and the results are given in Table 6.

Then the silicon carbide fiber was divided into three samples which were heated respectively in an argon gas atmosphere at 1600° C., 1800° C. and 2000° C. for 1 hr. The silicon carbide fiber heated at 2000° C. cannot retain the fibrous form. The silicon carbide fiber heated at 1800° C. retained the fibrous form. In this case, however, crystal grains of SiC deposited on the surface of the fiber, surface defects were observed on various sites, and the surface was in a coarsened state. These silicon carbide fibers were subjected to the measurement of the tensile strength and tensile modulus of elasticity. The results are given in Table 6.

TABLE 6

| | Firing (heating) temp. (°C.) | | | |
|---|---|---|---|---|
| | 1000 | 1600 | 1800 | 2000 |
| tensile strength [GPa] | 3.00 | 2.40 | 0.50 | immeasurable |
| tensile modulus of elasticity [GPa] | 170 | 230 | 120 | immeasurable |
| oxygen content [wt. %] | 1.4 | — | — | — |
| molar ratio of carbon to silicon (C/Si) | 1.35 | — | — | — |

As is apparent from the Table 6, the silicon carbide fiber of the present Comparative Example having an oxygen content of 1.4% by weight produced from the polycarbosilane having an oxygen content of 1.0% by weight had such a very poor heat resistance that it brought about a lowering in the fiber strength when heated at 1800° C. and could not be used at a high temperature above 1800° C.

COMPARATIVE EXAMPLE 2

A silicon carbide fiber having an average diameter of 14 μm was produced in the same manner as that of the Example 1, except that after the precursor fiber was made infusible, the fiber was heated in helium gas to 250° C., cooled to room temperature and then once taken out in air before firing.

Various properties of the resultant silicon carbide fiber were measured in the same manner as that of the Example 1 and the results are given in Table 7.

Subsequently, the silicon carbide fiber was divided into two samples, which were then heated respectively in an argon gas atmosphere at 1600° C. and 1800° C. for 1 hr. The silicon carbide fiber heated at 1800° C. could not retain the fibrous form. These silicon carbide fibers were subjected to the measurement of the tensile strength and tensile modulus of elasticity and the results are given in Table 7.

TABLE 7

| | Firing (heating) temp. (°C.) | | |
|---|---|---|---|
| | 1000 | 1600 | 1800 |
| tensile strength [GPa] | 3.10 | 0.90 | immeasurable |
| tensile modulus of elasticity [GPa] | 170 | 160 | immeasurable |
| oxygen content [wt. %] | 2.3 | — | — |
| molar ratio of carbon to silicon (C/Si) | 1.38 | — | — |

As is apparent from the Table 7, the silicon carbide fiber of the present Comparative Example produced by annealing an infusibilized fiber at 250° C., taking out the annealed fiber in air and firing the fiber had an oxygen content of 2.3% by weight and brought about a lowering in the fiber strength when heated at 1600° C., that is, had a poor heat resistance.

COMPARATIVE EXAMPLE 3

A polycarbosilane having a number-average molecular weight of 2000 and an oxygen content of 0.8% by weight was prepared in the same manner as that of the Example 1, except that use was made of a polydimethylsilane having an average degree (n) of polymerization of 36, and a precursor fiber was prepared from the polycarbosilane.

Subsequently the precursor fiber was made infusible and then heated to 1000° C. to fire the fiber in the same manner as that of the Example 1, thereby producing a silicon carbide fiber having an average diameter of 14 μm.

Various properties of the resultant silicon carbide fiber were measured and the results are given in Table 8.

Subsequently, the silicon carbide fiber was divided into three samples, which were then heated respectively in an argon gas atmosphere at 1600° C., 1800° C. and 2000° C. for 1 hr. The silicon carbide fiber heated at 2000° C. could not retain the fibrous form. The silicon carbide fiber heated at 1600° C. retained the fibrous form. In this case, however, crystal grains of SiC deposited on the surface of the fiber, surface defects were observed on various sites, and the surface was in a coarsened state. These silicon carbide fibers were subjected to the measurement of the tensile strength and tensile modulus of elasticity. The results are given in Table 8.

TABLE 8

| | Firing (heating) temp. (°C.) | | | |
|---|---|---|---|---|
| | 1000 | 1600 | 1800 | 2000 |
| tensile strength [GPa] | 2.80 | 1.30 | 0.70 | immeasurable |
| tensile modulus of elasticity [GPa] | 170 | 180 | 180 | immeasurable |
| oxygen content [wt. %] | 1.1 | — | — | — |
| molar ratio of carbon to silicon (C/Si) | 1.30 | — | — | — |

As is apparent from the Table 8, the silicon carbide fiber of the present Comparative Example having an oxygen content of 1.1% by weight produced from the polycarbosilane having an oxygen content of 0.8% by weight brought about a lowering in the fiber strength when heated at 1800° C., that is, had a poor heat resistance.

COMPARATIVE EXAMPLE 4

A precursor fiber prepared in the same manner as that of the Example 1 was heated in air to 200° C. at a temperature-raising rate of 10° C./hr to make the precursor fiber infusible, and then fired in the same manner as that of the Example 1, thereby producing silicon carbide fibers having an average diameter of 14 μm. The firing was conducted at each of 1000° C. and 1600° C.

Various properties of the resultant silicon carbide fibers are given in Table 9. The silicon carbide fiber heated at 1600° C. was so fragile that the fibrous strength was immeasurable.

TABLE 9

| | Firing temp. (°C.) | |
|---|---|---|
| | 1000 | 1600 |
| tensile strength [GPa] | 3.40 | immeasurable |
| tensile modulus of elasticity [GPa] | 170 | immeasurable |
| oxygen content [wt. %] | 13.0 | 0.8 |
| molar ratio of carbon to silicon (C/Si) | 1.33 | 0.99 |

As is apparent from the Table 9, the silicon carbide fiber of the present Comparative Example having an oxygen content of 13.0% by weight which had been made infusible by the thermal oxidation process brought about a remarkable lowering in the fiber strength when heated at 1600° C., that is, had a poor heat resistance.

COMPARATIVE EXAMPLE 5

A silicon carbide fiber having an average diameter of 14 μm was produced in the same manner as that of Example 5, except that the maximum temperature in the stabilizing treatment was 650° C. Various properties of the silicon carbide fiber were measured and the results are given in Table 10.

TABLE 10

| | Firing temp. (°C.) |
|---|---|
| | 1000 |
| tensile strength [GPa] | 2.40 |
| tensile modulus of elasticity [GPa] | 160 |
| oxygen content [wt. %] | 1.1 |
| molar ratio of carbon to silicon (C/Si) | 1.42 |

As is apparent from the Table 10, the silicon carbide fiber of the present Comparative Example wherein the maximum temperature in the stabilizing treatment was 650° C. had an oxygen content of 1.1% by weight and was poor in the mechanical properties and heat resistance.

Subsequently, the silicon carbide fiber was divided into three samples, which were then heated respectively in an argon gas atmosphere at 1600° C., 1800° C. and 2000° C. for 1 hr. The silicon carbide fiber heated at 2000° C. could not retain the fibrous form. The silicon carbide fiber heated at 1600° C. retained the fibrous form. In this case, however, crystal grains of SiC deposited on the surface of the fiber, surface defects were observed on various sites, and the surface was in a coarsened state.

What is claimed is:

1. A process for producing a silicon carbide fiber having an oxygen content of less than 1.0% by weight and a heat resistance of 1800° C. or above, which consists essentially of the steps of:
   a) preparing a precursor fiber by spinning a polycarbosilane having an oxygen content of less than 0.8% by weight;
   b) irradiating said precursor fiber from step a) with an ionizing radiation in an oxygen-free atmosphere or in vacuum to make the precursor fiber infusible;
   c) heat-treating said infusible fiber from step b) in the same atmosphere at a temperature of from 300° to 600° C. in the absence of an oxidizing atmosphere to stabilize said infusible fiber;
   d) exposing said stabilized infusible fiber from step c) to air;
   e) and firing said stabilized infusible fiber from step d) in an oxygen-free atmosphere or in vacuo at a temperature in the range of from 1000° to 2200° C., with the proviso that the temperature-raising rate in the firing is 100° C./hr or less at least when the temperature is in the range of 1000° to 1100° C.

2. The process according to claim 1 wherein said step e) is carried out at a rate of 25° C./hour up to 1000° C.

* * * * *